Patented Mar. 15, 1938

2,111,092

UNITED STATES PATENT OFFICE 2,111,092

DYESTUFF OF THE ANTHRIMIDECARBAZOLE SERIES

William Dettwyler, Milwaukee, Wis., assignor to E. I. du Pont de Nemours & Company, Wilmington, Del., a corporation of Delaware No Drawing. Application June 24, 1937,
Serial No. 150,133

1 Claim. (Cl. 260—46)

This invention relates to the preparation of new and valuable dyestuffs of the anthrimidecarbazole series and more particularly to the preparation of a new halogen containing 4,4'-dibenzoylamino-1,1'-dianthrimidecarbazole which exhibits improved fastness properties over the corresponding halogen-free compound.

The dyestuff obtainable by the process of U. S. Patent 996,109 referred to in "Colour Index" under No. 1150 as Indanthrene Olive G is deficient in light fastness, and various attempts have been made to obtain a dyestuff of this same shade with improved fastness properties. Direct halogenation of this dyestuff gives a product of no commercial value, since the tinctorial strength of the halogenated compound is materially reduced. It was therefore believed that the introduction of halogen in this particular dye molecule would be of no avail. Dyestuffs of other molecular configuration have therefore been produced in an attempt to obtain these desirable olive-gray shades.

It is an object of this invention to provide a new olive-gray dyestuff of substantially the same shade as that obtained by the process of U. S. Patent 996,109, which will have the same valuable dyeing properties but which will exhibit increased fastness, particularly to light.

I have found that when chlorine is introduced into the 6,6'-positions of the 4,4'-dibenzoylamino-1,1'-dianthrimidecarbazole that a new olive-gray dyestuff is obtained which exhibits improved light fastness over the corresponding non-chlorinated compound. This new dyestuff may be prepared by direct nitration of the 6,6'-dichloro-1,1'-dianthrimide (more particularly described in copending application Serial No. 143,925) with subsequent reduction of the resulting 4,4'-dinitro-1,1'-dianthrimide followed by benzoylation of the free amine group. The resulting dichlorodibenzoylaminodianthrimide is then ring-closed to the dianthrimidecarbazole by the usual methods, such as with sulfuric acid or aluminum chloride. It is to be noted in the original Patent 996,109 that the formula for the acid ring-closed dibenzoylaminodianthrimide is given as an acridine. Ring-closure of these dianthrimide compounds is now generally believed to given an anthrimidecarbazole linkage and not an acridine linkage, as the more recent patents and other literature disclose.

The following examples are given to illustrate the invention more fully. The parts used are by weight.

Example 1

20 parts of boric acid are dissolved in 400 parts of 96% sulfuric acid. To this solution are added 50 parts of 6,6'-dichloro-1,1'-dianthrimide (as more particularly disclosed in copending application Serial No. 143,925). When complete solution has been effected, the mass is cooled to 10° C. 35 parts of 64% nitric acid are then added slowly, keeping the temperature between 10° and 12° C. After the nitric acid is charged, the temperature is allowed to rise to 20° C. and is held there for 16 to 20 hours. The nitration mass is then drowned in 4000 parts of water, filtered and washed acid-free. The wet cake is then suspended in 3000 parts of water. 10 parts of 30% caustic soda solution and 150 parts of 30% sodium sulfide are added and heated to 90–95° C. for one hour. The resulting diamino body is then filtered off and washed with hot water until alkali-free. It is then dried. It is a dark blue powder having a green sulfuric acid solution.

Example 2

80 parts of 4,4'-diamino-6,6'-dichloro-1,1'-dianthrimide are suspended in 500 parts of o-dichlorobenzene and heated to 130° C. until dehydrated. Then 60 parts of benzoyl chloride are slowly added while the temperature is raised to 175° C. It is kept at this temperature for 3 hours. After cooling to room temperature the crystals are filtered off, washed with o-dichlorobenzene and alcohol in turns, and dried.

25 parts of the benzoylated product are dissolved in 250 parts of 96% sulfuric acid at 10 to 15° C. The first green solution turns brown and the stirring is continued for 3 hours. The crude color is then isolated by dilution in cold water. A purification can be effected by oxidation of this suspension with dichromate or chlorine in statu nascendi.

The so obtained dyestuff dyes from a brown vat in olive-gray shades somewhat bluer than the unchlorinated product, over which it exhibits superior light fastness. Its sulfuric acid solution is red.

The same product may be obtained by direct nitration of the 6,6'-dichloro-1,1'-dianthrimidecarbazole (U. S. application 143,925) followed by reduction to the corresponding diamine which is then benzoylated.

What I claim is:

The acid condensation product of 6,6'-dichloro-4,4'-dibenzoylamino-1,1'-dianthrimide which dissolves in sulfuric acid with a red solution and dyes cotton from a brown hydrosulfite vat in olive-gray shades.

WILLIAM DETTWYLER.